(12) United States Patent  (10) Patent No.: US 8,175,420 B2
Sposato et al.  (45) Date of Patent: May 8, 2012

(54) SYSTEM AND METHOD FOR IN-BROWSER PHOTO EDITING

(75) Inventors: Jonathan Sposato, Seattle, WA (US); Darrin Massena, Seattle, WA (US); Mike Harrington, Seattle, WA (US)

(73) Assignee: Google Inc., Mountain View, CA (US)

( * ) Notice: Subject to any disclaimer, the term of this patent is extended or adjusted under 35 U.S.C. 154(b) by 1024 days.

(21) Appl. No.: 12/051,337

(22) Filed: Mar. 19, 2008

(65) Prior Publication Data

US 2008/0285892 A1  Nov. 20, 2008

Related U.S. Application Data

(60) Provisional application No. 60/917,771, filed on May 14, 2007.

(51) Int. Cl.
*G06K 9/03* (2006.01)
*G09G 5/00* (2006.01)
*G06F 15/16* (2006.01)

(52) U.S. Cl. .................. 382/311; 345/619; 709/203

(58) Field of Classification Search ............. 382/303, 382/305, 307, 311, 312; 715/222, 700; 348/211.1, 348/211.3; 709/203, 217; 345/418, 619
See application file for complete search history.

(56) References Cited

U.S. PATENT DOCUMENTS

| | | | | |
|---|---|---|---|---|
| 6,583,799 | B1 * | 6/2003 | Manolis et al. ............... | 715/838 |
| 6,657,702 | B1 * | 12/2003 | Chui et al. ...................... | 355/40 |
| 6,898,601 | B2 * | 5/2005 | Amado et al. ................... | 1/1 |
| 7,535,492 | B2 * | 5/2009 | Kahn et al. ................. | 348/211.1 |
| 7,576,752 | B1 * | 8/2009 | Benson et al. ................ | 345/619 |
| 7,617,220 | B2 * | 11/2009 | Crowley et al. ....................... | 1/1 |

OTHER PUBLICATIONS

"Adobe Photoshop," From Wikipedia, the free encyclopedia, Internet Archive Search: *WayBack Machine Beta*, http://web.archive.org/web/20070202214643/http://en.wikipedia.org/wiki/Adobe_Photoshop, date range Nov. 28, 2003 to May 6, 2011, page last modified on Feb. 1, 2007, accessed on Dec. 1, 2011, 9 pages.
"Adobe Photoshop," From Wikipedia, the free encyclopedia, http://en.wikipedia.org/wiki/Adobe_Photoshop, last modified on Nov. 14, 2011, 7 pages.
"Flickr," From Wikipedia, the free encyclopedia, Internet Archive Search: *Wayback Machine Beta*, http://web.archive.org/web/20070206185609/http://en.wikipedia.org/wiki/Flickr, date range Dec. 6, 2004 to May 20, 2011, page last modified on Feb. 4, 2007, accessed on Dec. 1, 2011, 5 pages.

(Continued)

*Primary Examiner* — Kanjibhai Patel
(74) *Attorney, Agent, or Firm* — Sterne, Kessler, Goldstein & Fox PLLC

(57) ABSTRACT

An in-browser photo-editing application method and system. The method may typically include retrieving an image for manipulation along with a set of image manipulation instructions at a client computer and engaging a manipulation to the image from the client computer. Then, the client computer records image manipulation instructions simultaneous to displaying user edits. The set of image manipulation instructions are transmitted to the server when a mirror of the user's manipulated image is desired on the server. The server performs the manipulation instructions on its own copy of the original image to produce the mirror image. Copies of the pre-manipulated and post-manipulated image as well as the manipulation instructions may be stored at several locations including the client computer, the server computer or even a remote storage computer.

20 Claims, 7 Drawing Sheets

OTHER PUBLICATIONS

"Flickr," From Wikipedia, the free encyclopedia, http://en.wikipedia.org/wiki/Flickr, last modified on Nov. 2, 2011, 12 pages.

"iPhoto," From Wikipedia, the free encyclopedia, Internet Archive Search: *WayBack Machine Beta*, http://web.archive.org/web/20061026103053/http://en.wikipedia.org/wiki/IPhoto, date range Feb. 3, 2004 to Feb. 3, 2009, page last modified on Oct. 20, 2006, accessed on Dec. 1, 2011, 3 pages.

"iPhoto," From Wikipedia, the free encyclopedia, http://en.wikipedia.org/wiki/IPhoto, last modified on Nov. 18, 2011, 2 pages.

"Photo sharing," From Wikipedia, the free encyclopedia, Internet Archive Search: *WayBack Machine Beta*, http://web.archive.org/web/20060205102919/http://en.wikipedia.org/wiki/Photo_sharing, date range Apr. 6, 2005 to May 6, 2011, page last modified on Feb. 4, 2006, accessed on Dec. 1, 2011, 2 pages.

"Photo sharing," From Wikipedia, the free encyclopedia, http://en.wikipedia.org/wiki/Photo_sharing, last modified on Nov. 16, 2011, 5 pages.

"Picasa," From Wikipedia, the free encyclopedia, Internet Archive Search: *WayBack Machine Beta*, http://web.archive.org/web/20070213163535/http://en.wikipedia.org/wiki/Picasa, date range from Nov. 17, 2004 to May 6, 2011, page last modified on Feb. 7, 2007, accessed on Dec. 1, 2011, 4 pages.

"Picasa," From Wikipedia, the free encyclopedia, http://en.wikipedia.org/wiki/Picasa, last modified on Nov. 11, 2011, 7 pages.

"Shutterfly," From Wikipedia, the free encyclopedia, Internet Archive Search: *WayBack Machine Beta*, http://web.archive.org/web/20060113020115/http://en.wikipedia.org/wiki/Shutterfly, date range Oct. 31, 2005 to Feb. 26, 2011, page last modified on Jan. 6, 2006, accessed on Dec. 1, 2011, 1 page.

"Shutterfly," From Wikipedia, the free encyclopedia, http://en.wikipedia.org/wiki/Shutterfly, last modified on Nov. 17, 2011, 4 pages.

"Snapfish," From Wikipedia, the free encyclopedia, Internet Archive Search: *WayBack Machine Beta*, http://web.archive.org/web/20060113012118/http://en.wikipedia.org/wiki/Snapfish, date range Dec. 15, 2005 to Jan. 11, 2009, page last modified on Jan. 6, 2006, accessed on Dec. 1, 2011, 1 page.

"Snapfish," From Wikipedia, the free encyclopedia, http://en.wikipedia.org/wiki/Snapfish, last modified on Nov. 20, 2011, 2 pages.

* cited by examiner

SYSTEM AND METHOD FOR IN-BROWSER PHOTO EDITING

CROSS-REFERENCE TO PROVISIONAL PATENT APPLICATION

This patent application claims priority from a related U.S. Provisional Patent Application No. 60/917,771 entitled 'SYSTEM AND METHOD FOR IN-BROWSER PHOTO EDITING' filed on May 14, 2007 which is incorporated herein in its entirety.

BACKGROUND

Digital photo editing and digital photo editors are common in today's digital photography technology. In digital editing, photographs are typically taken with a digital camera and input directly into a computer for storage and manipulation. Additionally, traditional printed photograph may be digitized using a scanner and also stored and manipulated on a computer. Photos can also be stored and obtained from stock photography databases. With the advent of computers, graphics tablets, and digital cameras, the term photo editing encompasses everything that can be done to a photo in a darkroom or on a computer. Photo editing is most commonly subtle (e.g. alterations to coloring, contrast, so forth), but may be explicit also (e.g. overlaying a head onto a different body, changing a sign's text). Image editing software can be used to apply effects and warp an image in whatever way possible until the desired result is achieved. Image editing software can also be used to create images from scratch for example with tools for drawing or adding text. Sometimes, after photo editing, the resulting image has little or no resemblance to the photo from which it started.

Computer programs are prevalent and easily accessible that allow any computer to be used for digital photo editing. Often times, a standalone software package may be purchased and installed on a personal computer or in a computer networking environment. These conventional software programs allow for digital photos to be manipulated and saved at the local machine in which the photo editing software is running. Thus, a user of personal computer with such photo editing software may easily manipulate any number of digital photos that are also stored at that computer. In this scenario, the task-intensive steps of actual photo manipulation are accomplished by the personal computer.

Further, various networking environments may allow photo editing software to be run at some accessible server computer such that images are manipulated at the server computer at the behest of the connected client computer. In this scenario, the task-intensive steps of actual photo manipulation are accomplished by the server computer that hosts the photo editing software and the client computer merely acts as a controller.

With the advent of web sites and server farms capable of storing a tremendous amount of data, various computer users have begun storing digital photos in online storage services. In this manner, a person may access stored digital photos from any computer that the person may be using. With universal access to stored digital photos, one may upload photos from virtually anywhere and store the digital photos in an online manner. However, well-known and comprehensive photo editing software may only be resident on one personal computer or within a specific network of computers. Thus, even if a person is able to upload and store their newly created digital photos from any computer connected to the internet, the person cannot access their photo editing software to manipulate the newly created and stored digital photos.

What is needed is a software solution that allows a user to take advantage of the ability to upload and store digital photos from any computer connected to the internet such that the user may also exercise an additional ability to edit these digital photos while maintaining the unique relationship between a user and their respective relationships with online storage services.

BRIEF DESCRIPTION OF THE DRAWINGS

The foregoing aspects and many of the attendant advantages of the claims will become more readily appreciated as the same become better understood by reference to the following detailed description, when taken in conjunction with the accompanying drawings, wherein:

DETAILED DESCRIPTION

The following discussion is presented to enable a person skilled in the art to make and use the subject matter disclosed herein. The general principles described herein may be applied to embodiments and applications other than those detailed above without departing from the spirit and scope of the present detailed description. The present disclosure is not intended to be limited to the embodiments shown, but is to be accorded the widest scope consistent with the principles and features disclosed or suggested herein.

Figure 1:
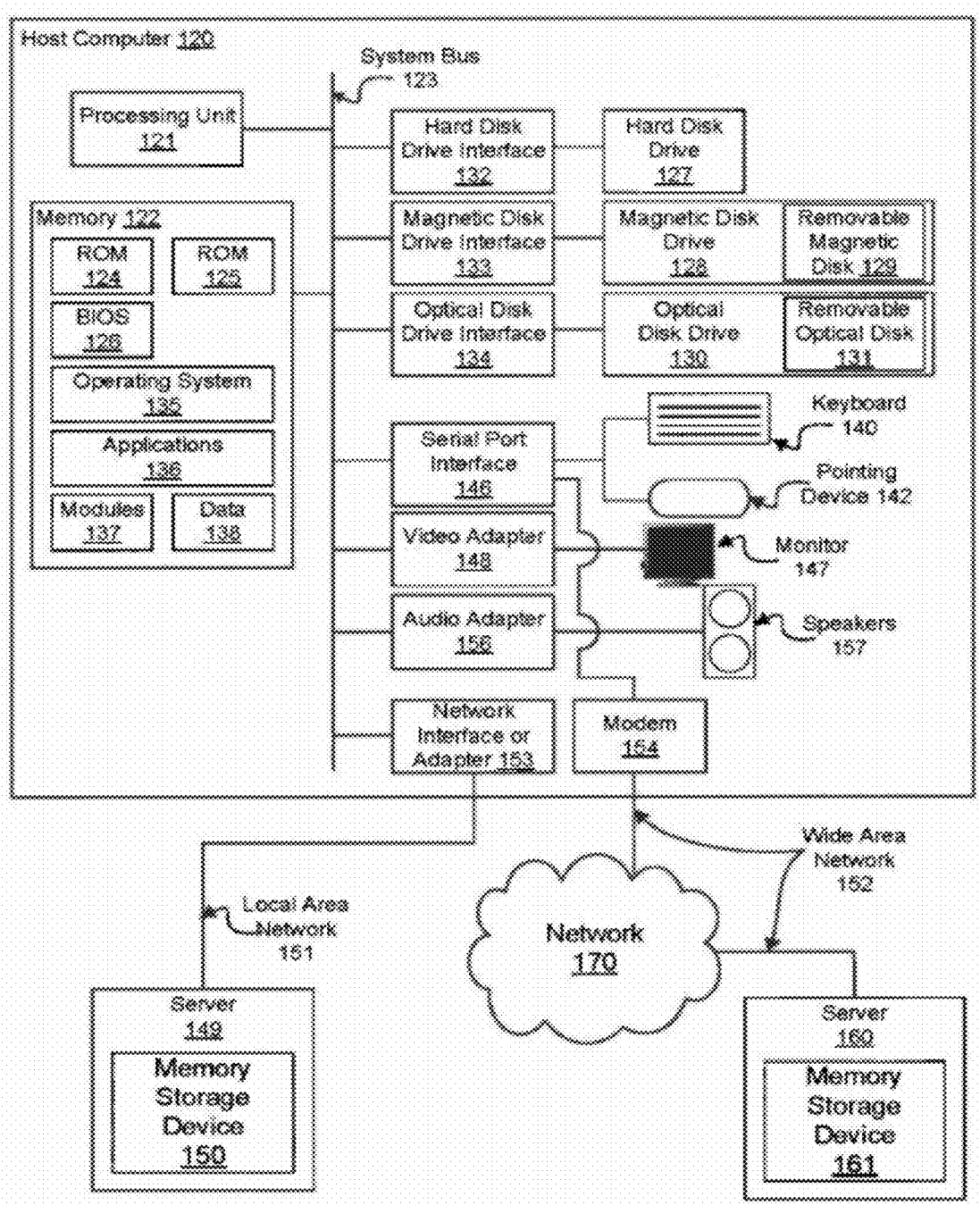
FIG. 1 shows a diagram of a suitable computing environment for practicing various aspects of an in-browser photo editing system and method according to an embodiment of an invention disclosed herein.

FIG. 1 and the following discussion are intended to provide a brief, general description of a suitable computing environment in which the invention may be implemented. Although not required, aspects of an in-browser photo editing system and method will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, cellular or mobile telephones, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory includes read only memory (ROM) 124 and random access memory (RAM) 125. A basic input/output system (BIOS) 126, containing the basic routines that help to transfer information between elements within the personal computer 120, such as during start-up, is stored in ROM 124. The personal computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide nonvolatile storage of computer readable instructions, data structures, program modules and other data for the personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port or a universal serial bus (USB). A monitor 147 or other type of display device is also connected to the system bus 123 via an interface, such as a video adapter 148. One or more speakers 157 are also connected to the system bus 123 via an interface, such as an audio adapter 156. In addition to the monitor and speakers, personal computers typically include other peripheral output devices (not shown), such as printers.

The personal computer 120 operates in a networked environment using logical connections to one or more remote computers, such as remote computers 149 and 160. Each remote computer 149 or 160 may be another personal computer, a server, a router, a network PC, a peer device or other common network node, and typically includes many or all of the elements described above relative to the personal computer 120, although only a memory storage device 150 or 161 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet. As depicted in FIG. 1, the remote computer 160 communicates with the personal computer 120 via the local area network 151. The remote computer 149 communicates with the personal computer 120 via the wide area network 152.

When used in a LAN networking environment, the personal computer 120 is connected to the local network 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Figure 2:
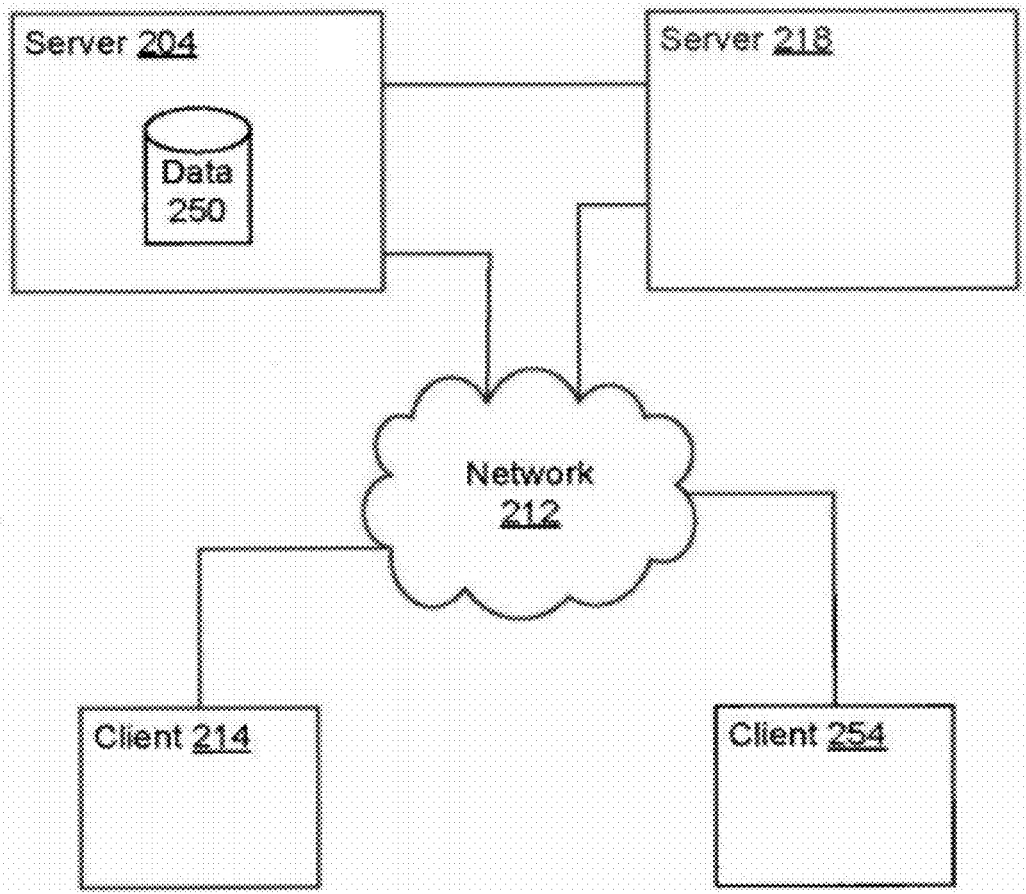
FIG. 2 is a diagram of a suitable computing network for practicing various aspects of an in-browser photo editing system and method according to an embodiment of an invention disclosed herein.

FIG. 2 illustrates an exemplary architecture of a networked computer system in which aspects of an in-browser photo editing application may be practiced. The computer network 212 may be a local area network 151 (FIG. 1), a wide area network 152 (FIG. 1), or a combination of networks that allow the server computer 204 to communicate with remote computers, such as the remote server computer 218, either directly or indirectly. The server computer 204 and the remote server computer 218 are typically similar to the personal computer 120 depicted in FIG. 1 and discussed above.

Such a computer network 212 allows for the sending and receiving of data associated with digital images that may be used with an in-browser photo editing system. Such data may be stored in a database 250 on a server computer 204. This data may be updated, assimilated and/or altered according to additional data sent and received to and from various other computers in the computer network such as remote server computer 218 and client computers 214 and 254.

With such a computer network, a system for manipulating digital image in a computer-network environment may be realized. A typical system includes a client computer 214 having a web browser application executing thereon and having an in-browser image manipulation application executing within the context of the web browser application. Typically, a client computer will have a dedicated web browsing application, such as Internet Explorer from the Microsoft Corporation such that when browsing web pages over the Internet, a set of default rules and applications are implemented to accomplish all web-browser related activities. The web browser application may also be any other common web browser such as Mozilla Firefox, Netscape Navigator, and Safari. The web browser may be used to navigate and utilize web sites and web applications. One specific web application may be an in browser photo editor as described herein. This in-browser photo editor and methods associated therewith are described in more detail below with respect to FIG. 3.

The system may further include a server computer 218 communicatively coupled to the client computer 214 over the computer network 212. In one embodiment, the server computer includes an image manipulation service executing thereon, such that a client computer 214 may invoke the service via the Internet connection. With that, the in-browser photo editor includes an image manipulation application that is operable to handle a number of image manipulation tasks. In an abstract form then, the application may receive an instruction for manipulating an image (e.g., an instruction to crop, rotate, resize, etc.) and determine whether the manipulation is more efficiently executed at the client computer 214 or at the server computer 218.

The system may further include a remote client computer 254 communicatively coupled to the client computer 214 and the server computer 218. The remote computer may be used for additional storage and manipulation of images such that it is operable to store digital images for the client computer 214 to retrieve for manipulation.

Figure 3:
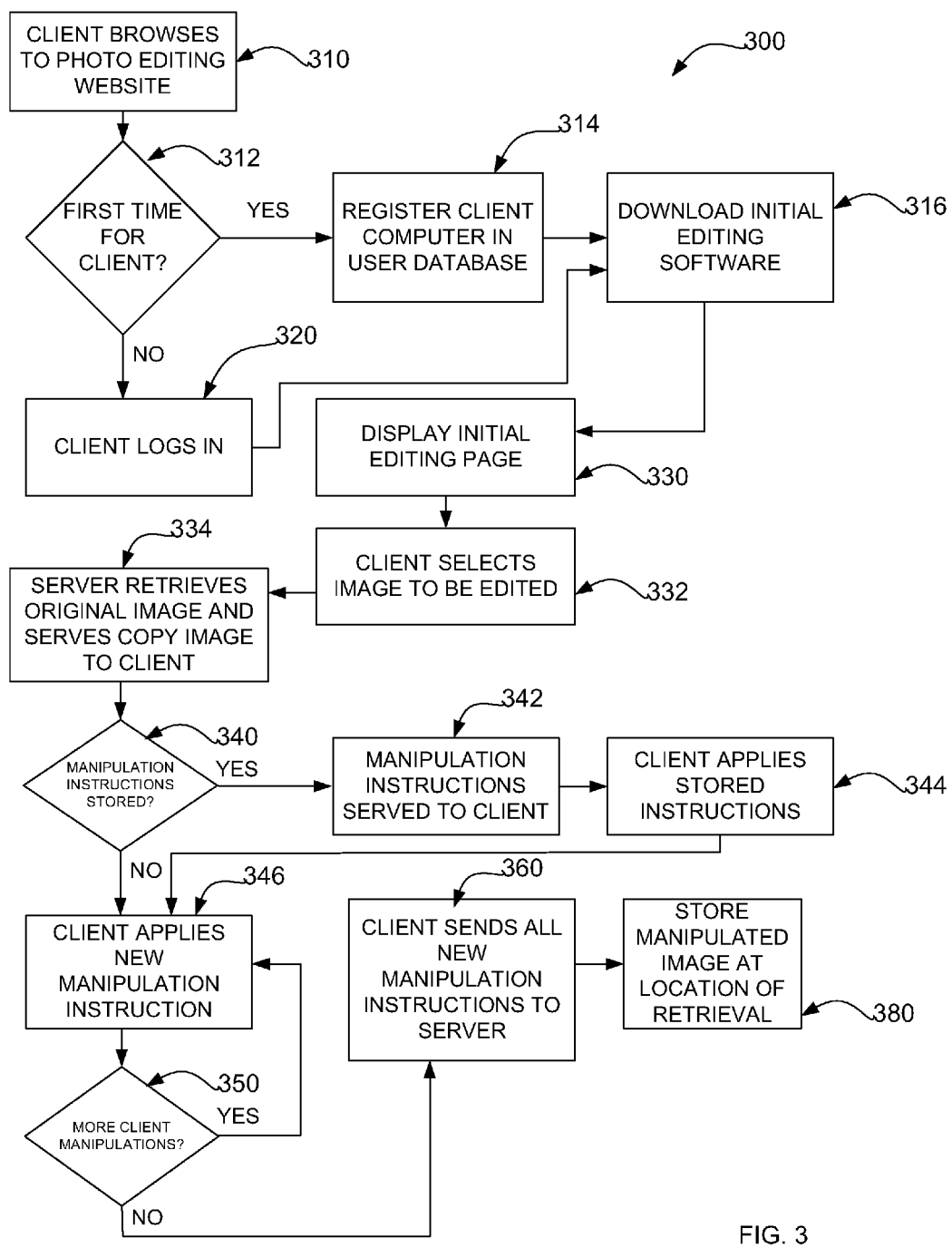
FIG. 3 shows a flow diagram of a method for manipulating an image using a in-browser photo editing application according to an embodiment of an invention disclosed herein.

FIG. 3 shows a flow diagram of a method for manipulating an image using a in-browser photo editing application according to an embodiment of an invention disclosed herein. The method of FIG. 3 may typically be carried out in a computer networking environment as described above and in the form of computer-executable instructions encoded on a computer-readable medium.

As an overview, the method may typically include retrieving an image for manipulation at a client computer and engaging a manipulation to the image from the client computer. Such a manipulation is typically chosen by the user of the client computer and information about the manipulation is also transmitted to a server computer where the same image is uploaded and operable to be manipulated. As the user implements more manipulation instructions, the same instructions are sent to the server and the image is manipulated at the server as well. Copies of the pre-manipulated and post-manipulated image and the manipulation instructions may be stored at several locations including the client computer, the server computer or even a remote storage computer.

Within the context of FIG. 3, the method may begin at a client computer when an image is desired to be retrieved for manipulation. As a first step 310, a user may browse to a photo-editing website (i.e., a specific URL) as a basis for beginning a photo-editing method.

When accessed, a server computer that hosts the URL and related services may initiate a transparent download of the photo editing application to the local client computer such that when the client computer accesses the URL again, the process is streamlined due to pre-loaded functionality. The application operates in real time and is developed on top of a secure runtime with high performance graphics capability such as Flash™ from Adobe™ or Silverlight™ from Microsoft™. Flash™ is a popular method for adding animation and interactivity to web pages and several software products, systems, and devices are able to create or display Flash™. Flash™ is commonly used to create animation, advertisements, various web-page components, to integrate video into web pages, and more recently, to develop rich Internet applications.

As a result, the user may experience a more user-friendly desktop feel to an in-browser photo-editing system and method. Further, additional aspects of the system and method disclosed herein may be implemented of claim outside of browser realm, i.e. a desktop application that may operate in its own windowed environment. Further, the method and system may be extended by hybrid cooperation of the in-browser photo editor with a desktop application to increase the overall capability of the system. Further yet, the method and system may be further extended to allow a desktop application to be remotely accessed from a remote location using a web browser on a wholly separate client machine that is accessible via a network (e.g., the internet, a company intranet, etc.). Still further, the method and system disclosed herein allows for third party software to securely extend a web application to take advantage of the locally available functionality of the in-browser photo-editing software as well as the server-side capabilities allowed through the in-browser photo-editing software. This may typically be accomplished through third party software programmers building modules/bridges to the in-browser photo-editing software in order to transfer data and/or files, or to provide additional editing functionality, or general application features.

Once the client computer is ready to use an in-browser photo editing system, an initial editing page may be displayed in the browser at step 330. Specific aspects of the initial editing page and other subsequent pages are discussed below with respect to FIGS. 4-7.

At step 332, a user of the client computer may then locate and retrieve an image for manipulation. In a first method, a user may retrieve an image stored at a local data store (e.g., a local hard drive, DVD-ROM, etc.) for image manipulation. Alternatively, specific relationships and links with other websites and server computers may be established such that the user may log in to the local website and immediately be able to access digital photos stored on other linked websites. A list of accessible locations may be displayed in the browser and may include a local drive, a network drive, or any number of linked storage services such as Yahoo.com™ or Flick™. Further, a user may even enter a URL to search for photos that may be resident at the URL location.

As an image is selected by the user, two copies are typically realized. A copy remains at the server computer that retrieved the image and the server also transmits a copy of the image to the client computer at step 334. If this particular image has been previously manipulated within the context of this system and method, then manipulation instructions will also typically be stored with the image. As such, at step 340, the method determines whether or not manipulation instructions have been stored with the retrieved image. If so, then the manipulation instructions are transmitted to the client computer along with the retrieved image at step 342. Then the client computer may implement these instructions in any possible manner. That is, a user may be free to undo or backup to a previous image state because the manipulation instructions from some previous manipulation session are available. Implementing the stored instructions occurs at step 344.

If there are no stored instructions to deal with, or the stored instruction have been sent to the client computer, the method moves to step 346 where the client may implement new manipulation instructions at the desire of the user. The method includes a looping inquiry for client manipulations at step 350. As the client wishes to implement any number of new instructions on the local image, the method loops back upon itself until no more manipulations are desired. As each manipulation is implemented, the client computer stores information about the manipulations locally such that the information may later be transmitted to the server computer (e.g., when the user saves the manipulated image or uploads it). Such stored information not only includes the nature of the manipulation instruction but also the order in which the instructions were implemented.

At step 360, which may also correspond with a save image at the local computer, the client computer sends all manipulation instruction information to the server computer. The server computer may then implement all uploaded instructions to its copy of the image. The server computer may also then store the manipulated image as well as the uploaded set of manipulation instructions at its own data store or some remote data store in which the image was first retrieved.

In another embodiment, the manipulation instructions may be transmitted individually to the server computer as the user invokes them in real time. That is, instead of waiting until the user saves the image after numerous manipulation instructions, the individual manipulation instructions may be transmitted to the server after each manipulation is invoked. In this manner, the copy of the image on the server may also undergo the manipulation in actual real time as a mirrored copy of the image at the client computer.

Figure 4:
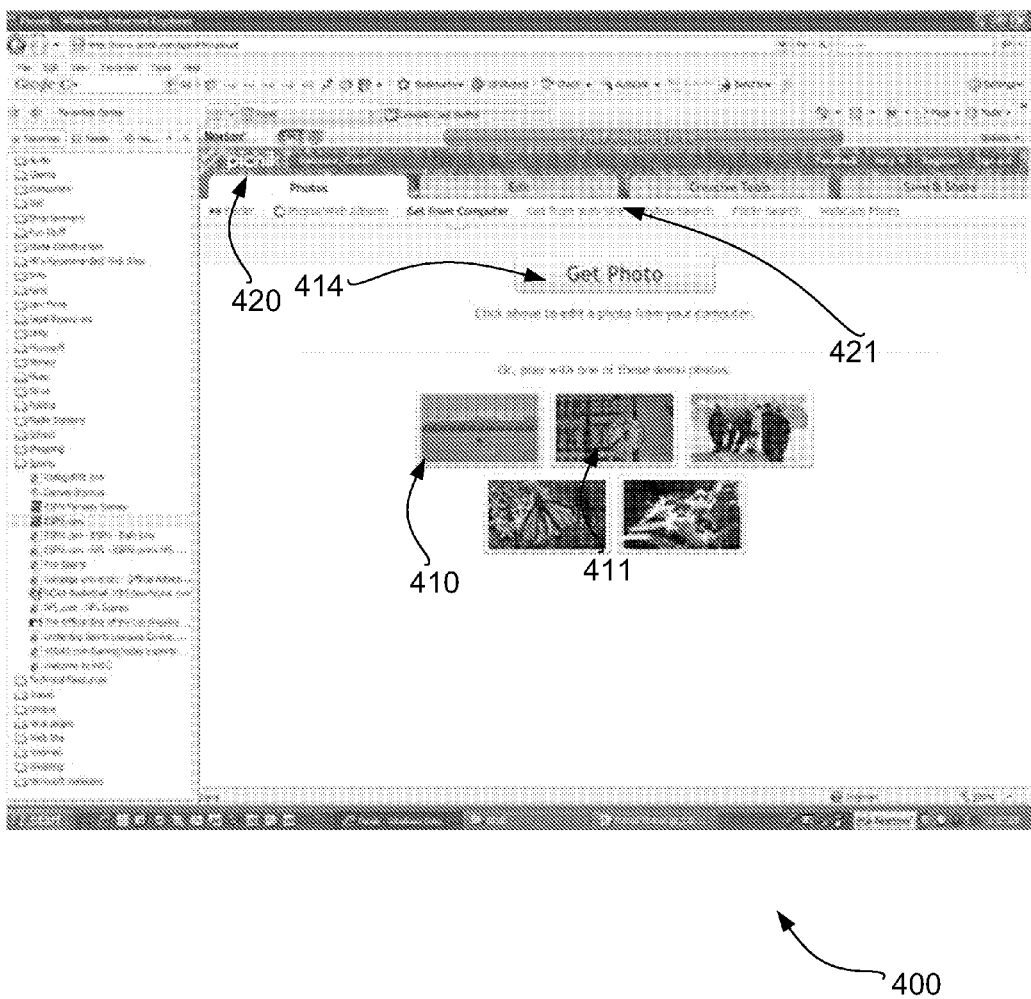
FIG. 4 shows a screen shot of an initial browser destination (e.g., a web page) that may be accessed by a client computer when beginning a method for using an in-browser photo editing system according to an embodiment of an invention disclosed herein.

FIG. 4 shows a screen shot 400 of an initial browser destination (e.g., a web page) that may be accessed by a client computer when beginning a method for using an in-browser photo editing system according to an embodiment of an invention disclosed herein. Such a webpage comprises a conventional URL, such as www.picnik.com, wherein a typical computer web browser may be used to access it. Such typical web browsing software includes Microsoft Internet Explorer, Netscape Navigator, Safari, and Firefox.

A list 421 of accessible locations may be displayed in the browser and may include a local drive, a network drive, or any number of linked storage services such as Yahoo.com™ or Flickr™. Further, a user may even enter a URL to search for photos that may be resident at the URL location. Available photos may be displayed in a display area on the web page such as photos 410 and 411. Once a specific photo is identified and selected by the user, i.e., via highlighting, clicking or otherwise, the digital photo is retrieved from the location and retained at the local machine.

The local machine may further store additional information in a cache to facilitate the use of an in-browser photo editor. Credentials for the user may be stored such that when logged in to the in-browser photo editor website, links to other stored files may be automatically validated and available. Further, previous locations of recently used images may also be stored. Further yet, previous manipulations undertaken during a photo editing session may be recalled such that any manipulations may be "undone" or otherwise altered. This feature may also be retained if the user browses away from the in-browser photo editor. This feature may be referred to as Perfect Memory.

Figure 5:
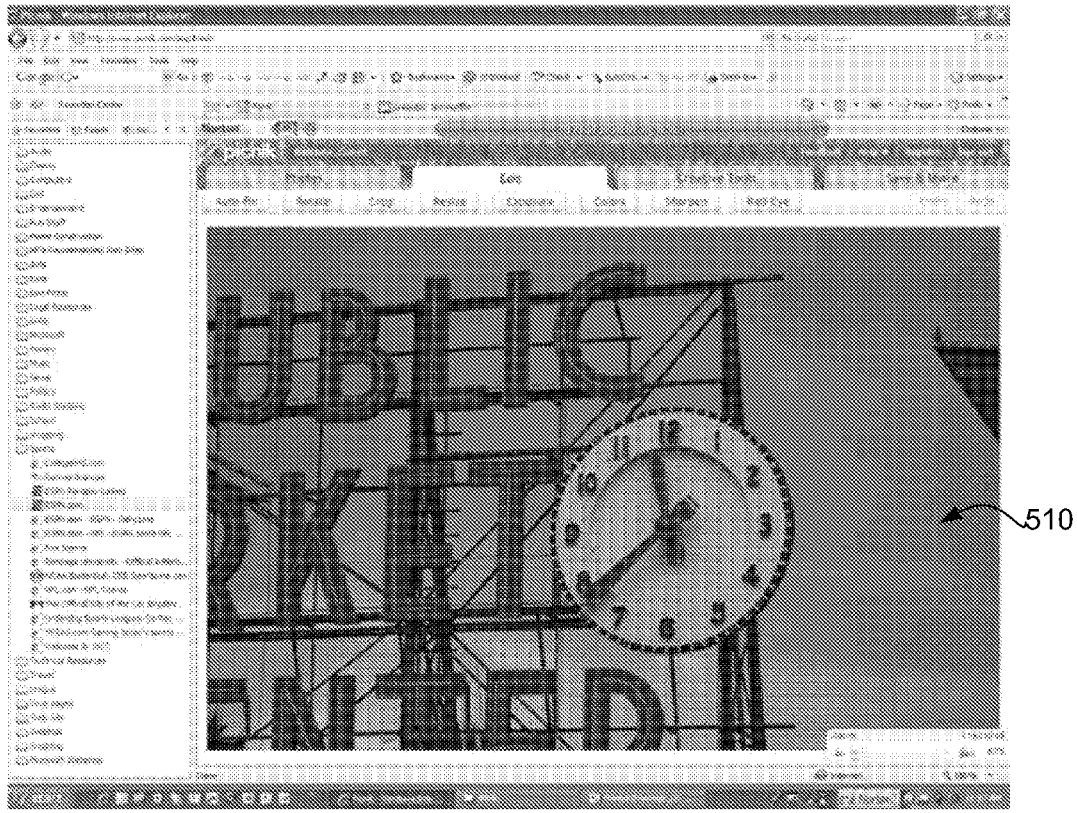
FIG. 5 shows a screen shot of an editing webpage that may be accessed by a client computer when using an in-browser photo editing system according to an embodiment of an invention disclosed herein.

FIG. 5 shows a screen shot 500 of an editing webpage that may be accessed by a client computer when using an in-browser photo editing system according to an embodiment of an invention disclosed herein. An editing page may show a currently selected image 510 that may be edited. This image 510 corresponds to the digital photo selected by the Get Photo process described above. Further, the editing page provides a number of photo editing tools for a user. Such tools and editing aspects include:

Perfect Memory: a method by which the application preserves a hi-fidelity, original version of the user's edited photo for later retrieval or regression. A history of all edits is also preserved to ease further manipulation by the user.

Overlap download/upload: a method by which the application transfers data packets to/from the application to the server without waiting for previous transfer to finish. That is, the in-browser photo-editing software may synchronize the upload/download requests on the server where the requests may exist on multiple threads, or even on different machines.

Synchronization of rendering across client/server: a method whereby identical results of editing can be produced by both the client and server computers.

Editing another image via image edit tree: a design/method of enabling users to allow someone else to edit their photo and persist those changes for others to see, and mechanism for user and editors to step thru a sequence that denotes when edits happened and what they were.

Collaborative online editing: a method of enabling multiple users to edit the same picture online in a collaborative, real time model.

Inline editing: a method of allowing users to edit their photo using the application user interface on the same web page where the photo is hosted.

Bridging with other sites: a method by which the application seamlessly connects with other websites quickly and automatically transferring images to/from other sites.

User Interface accordion panel: a design of user interface for dynamically displaying more or less of an application component based on the user invocation.

Pull images from any URL: a method by which the application retrieves pictures from another website via user input of its URL.

Dynamic localization of Flash™ content: a method by which localizable text strings can be dynamically changed by the application based on knowledge of what language region the application is running.

Communication mechanism between privileged application components and non-privileged application components: a method by which communication occurs between a 'privileged application component' such as, but not limited to, a browser extension, and a 'non-privileged' component such as what is running inside the browser or 'browser page and content'.

Application User Interface workflow: a design of a user interface that allows easy sequencing of user workflow from importing of photo into the application, edit, creative tools, to exporting out of the application via saving or emailing.

Clip art, head on body: a method whereby a picture may be identified as having a head such that the head may be placed within a different image, such as a clip art image.

As a user manipulates the chosen image 410, the processing required for the manipulation is accomplished by the client computer. However, additional information about the manipulations are also stored at a server computer. In this manner, the task-intensive steps of manipulating the image may be processed by a local processor but the results may be stored by a remote server. Thus, even if one were to log off the current client computer and return to the in-browser editor from a different client computer, the results of each manipulation undertaken are stored at a server and may be undone because of the perfect memory nature of the system.

Figure 6:
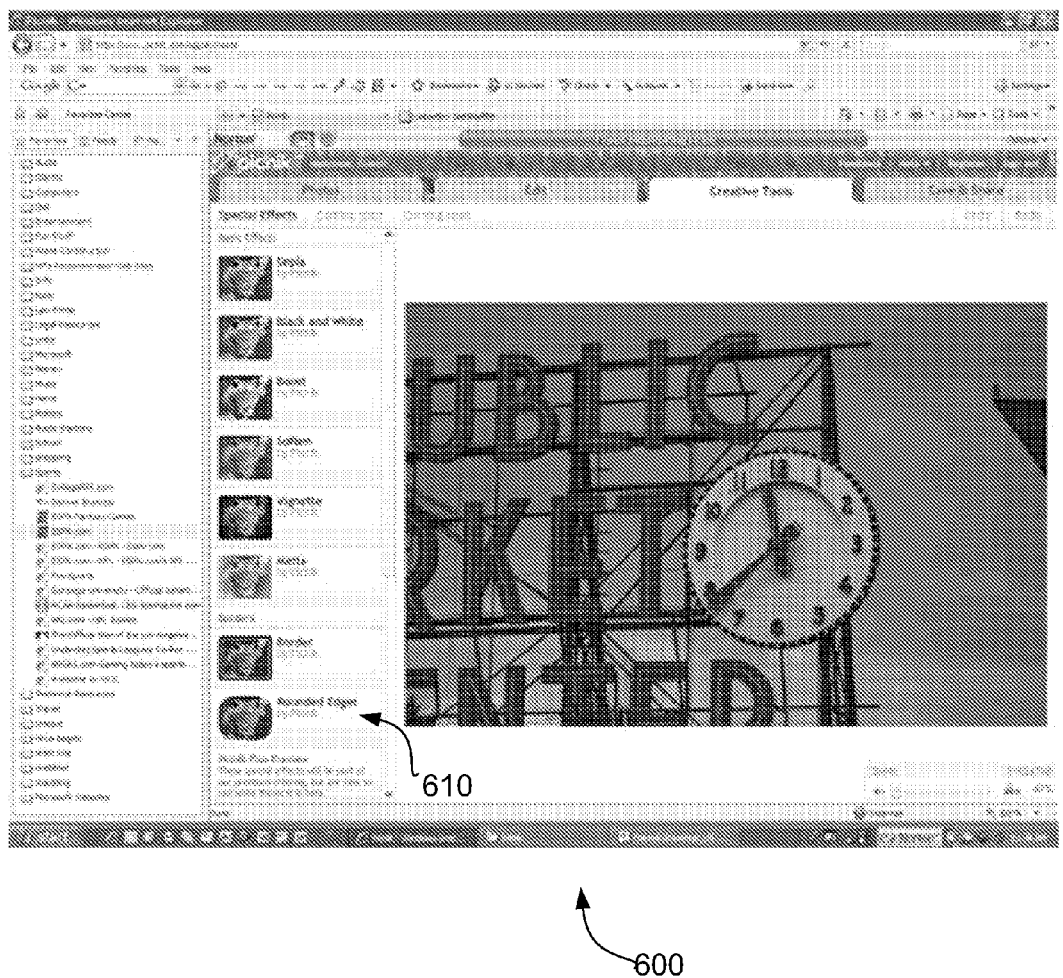
FIG. 6 shows a screen shot of a creative manipulation webpage that may be accessed by a client computer when using an in-browser photo editing system according to an embodiment of an invention disclosed herein.

FIG. 6 shows a screen shot 600 of a creative manipulation webpage that may be accessed by a client computer when using an in-browser photo editing system according to an embodiment of an invention disclosed herein. A creative manipulation page may show a currently selected image 605 that may be edited. This image 605 corresponds to the digital photo selected by the Get Photo process described above. Further, the editing page provides a number of creative processing tools 610 for a user. Such tools include those which have been described above.

Figure 7:
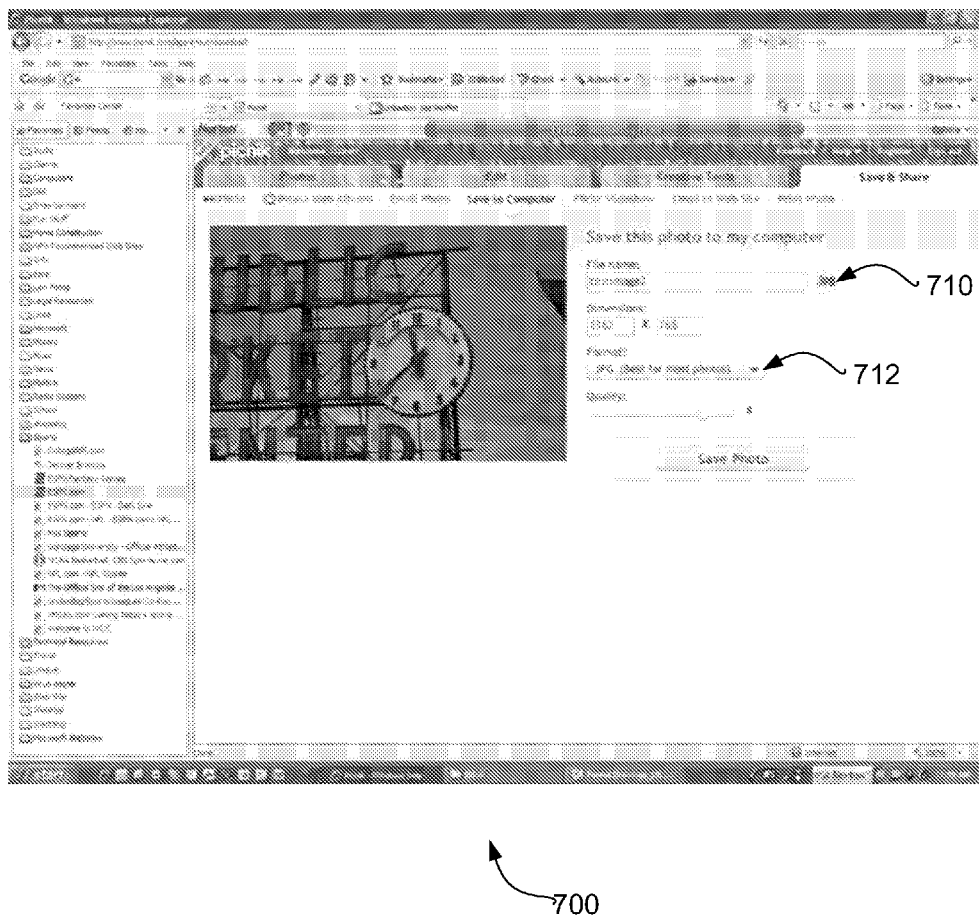
FIG. 7 shows a screen shot of a photo storage webpage that may be accessed by a client computer when using an in-browser photo editing system according to an embodiment of an invention disclosed herein.

FIG. 7 shows a screen shot 700 of a photo storage webpage that may be accessed by a client computer when using an in-browser photo editing system according to an embodiment of an invention disclosed herein. A photo storage page may show a currently selected image 705 that may be stored. This image 705 corresponds to the digital photo selected by the Get Photo process described above. Further, the storage page provides a number of storage tools 710 and 712 for a user. Such tools include those which have been described above.

While the subject matter discussed herein is susceptible to various modifications and alternative constructions, certain illustrated embodiments thereof are shown in the drawings and have been described above in detail. It should be understood, however, that there is no intention to limit the claims to the specific forms disclosed, but on the contrary, the intention is to cover all modifications, alternative constructions, and equivalents falling within the spirit and scope of the claims.

What is claimed is:

1. A computer-related method for manipulating digital images in a computer-network environment, comprising:
    at a client computer, enabling a user to select an image for manipulation;
    retrieving the selected image for manipulation by the client computer;
    enabling a user to select at least one manipulation instruction and processing the at least one manipulation instruction at the client computer to manipulate the retrieved image; and
    transmitting information about the nature and the order of the selected at least one manipulation instruction to a server computer for processing when the client computer signals that a server copy of the retrieved image should be updated such that after processing, identical results of manipulating are produced by both the client and server computers.

2. The method of claim 1 wherein the retrieving the image further comprises retrieving the image from a data store at the client computer.

3. The method of claim 1 wherein the retrieving the image further comprises retrieving the image from a data store at a remote computer.

4. The method of claim 1 wherein the retrieving the image further comprises retrieving the image from a remote computer over a computer network.

5. The method of claim 1, further comprising transmitting the at least one manipulation instruction with the manipulated image for storage at the server computer after the at least one manipulation instruction is processed at the client computer.

6. The method of claim 1, further comprising transmitting the at least one manipulation instruction with the manipulated image for storage at a remote location after the at least one manipulation instruction is processed at the client computer.

7. The method of claim 1, further comprising storing a manipulated copy of the image at the server computer.

8. The method of claim 1, further comprising storing an unmanipulated copy of the image at the server computer after the manipulation.

9. The method of claim 1, further comprising:
    determining that at least one manipulation instruction is stored with the retrieved image at the server; and
    receiving information about the at least one manipulation instruction at the client computer with the retrieved image.

10. The method of claim 1, further comprising providing a user interface for suitable for image manipulation within a web browsing application.

11. A system for manipulating digital images in a computer-network environment, the system comprising:
    a client computer having a web browser application executing thereon and
    having an in-browser image manipulation application executing within the context of the web browser application; and
    a server computer communicatively coupled to the client computer over the computer network, the server computer having a server image manipulation service executing thereon;
    wherein the in-browser image manipulation application is operable to enable a user to select a set of instructions for manipulating an image and produce a manipulated image at the client computer; and
    wherein the server image manipulation service is operable to receive information about the nature and order of the set of instructions implemented at the client computer and produce a manipulated image at the server when the client computer signals that the retrieved image should be updated such that after processing identical results of manipulating are produced by both the client and server computers.

12. The system of claim 11, wherein the web browser application comprises a web browser.

13. The system of claim 11 wherein the manipulation comprises a manipulation from the group comprising: resize, crop, color manipulation, rotate, sharpen, enhance, remove red-eye, remove blemish, add tone effect, reverse image, reverse exposure, add, delete, and modify element.

14. The system of claim 11, further comprising a remote computer communicatively coupled to the client computer and the server computer, the remote computer operable to store digital images such that the client computer may retrieve an image for manipulation.

15. A non-transitory computer-readable medium having computer-executable instructions for causing at least one processor in a client computer to perform the following operations for manipulating, digital images in a computer-network environment:
    enabling a user to select an image for manipulation;
    retrieving the selected image for manipulation by the client computer;
    enabling a user to select at least one manipulation instruction and processing the at least one manipulation instruction at the client computer to manipulate the retrieved image; and
    transmitting information about the nature and the order of the at least one manipulation instruction to the server computer for processing when the client computer signals that a server copy of the retrieved image should be updated such that after processing, identical results of manipulating are produced by both the client and server computers.

16. The non-transitory computer-readable medium of claim 15 wherein the retrieving the image further comprises retrieving the image from a data store at the client computer.

17. The non-transitory computer-readable medium of claim 15 wherein the retrieving the image further comprises retrieving the image from a data store at a remote computer.

18. The non-transitory computer-readable medium of claim 15 wherein the retrieving the image further comprises retrieving the image from a remote computer over a computer network.

19. The non-transitory computer-readable medium of claim 15 having further computer-executable instructions for causing at least one processor in a client computer to perform the following operations:

determining that at least one manipulation instruction was stored with the retrieved image; and transmitting information about the at least one manipulation instruction to the client computer with the retrieved image.

20. The non-transitory computer-readable medium of claim 15 having further computer-executable instructions for storing the at least one manipulation instruction with the manipulated image at the server computer after the manipulation.

* * * * *

UNITED STATES PATENT AND TRADEMARK OFFICE
CERTIFICATE OF CORRECTION

PATENT NO. : 8,175,420 B2
APPLICATION NO. : 12/051337
DATED : May 8, 2012
INVENTOR(S) : Sposato et al.

Page 1 of 1

It is certified that error appears in the above-identified patent and that said Letters Patent is hereby corrected as shown below:

Column 10
Line 20, Claim 11, please replace "after processing identical results" with
--after processing, identical results--.

Column 10
Lines 38, Claim 15, please replace "manipulating, digital images" with
--manipulating digital images--.

Signed and Sealed this
Seventh Day of August, 2012

David J. Kappos
*Director of the United States Patent and Trademark Office*